March 26, 1957  J. M. CUNNIEN  2,786,632
CONTROL APPARATUS FOR FORCED AIR FURNACE
Filed Nov. 16, 1953
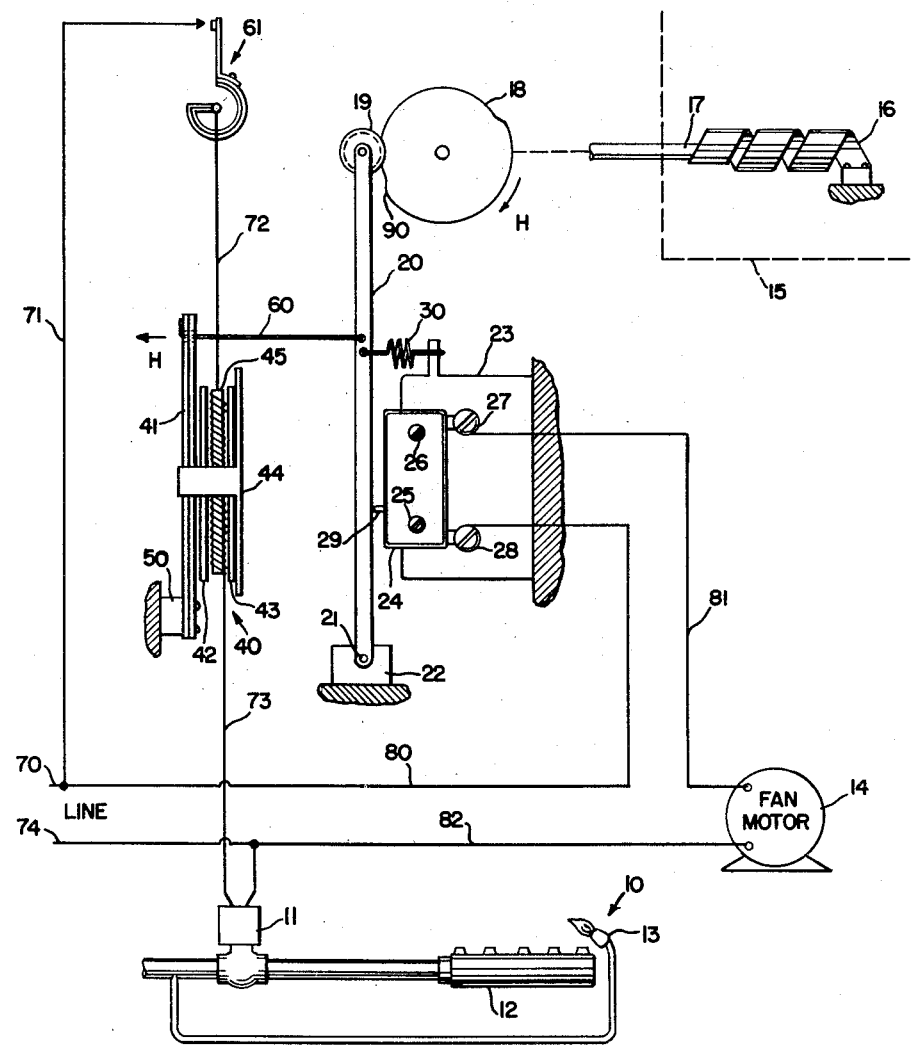
INVENTOR.
JAMES M. CUNNIEN
BY George H Fisher
ATTORNEY United States Patent Office 2,786,632
Patented Mar. 26, 1957

2,786,632

CONTROL APPARATUS FOR FORCED AIR FURNACE

James M. Cunnien, West St. Paul, Minn., assignor to Minneapolis-Honeywell Regulator Company, Minneapolis, Minn., a corporation of Delaware Application November 16, 1953, Serial No. 392,307

6 Claims. (Cl. 236—9)

The present invention is concerned with the control of the circulating fan of a forced air type heating system. More particularly, the present invention is concerned with the control of the circulating fan of the down flow type furnace.

It is standard practice in the forced air type heating system to provide a temperature sensitive means which responds to the temperature of the heat exchange chamber or bonnet of the furnace to energize and deenergize the circulating fan in accordance with the temperature of this chamber. Such a control is necessary to cause the heated air to be circulated throughout the area to be heated only after the air has reached a desired temperature.

The type of system above described is quite satisfactory when a furnace is used in which the hot air from the furnace leaves the upper part of the furnace. In this case the circulating fan of the furnace merely aids the natural circulation of the hot air which tends to rise. However, with the advent of the so-called slab-type home the down flow furnace was introduced. The down flow furnace is a furnace which makes use of a circulating fan to circulate the hot air but in this type of furnace the fan causes the air to circulate against the natural tendency of the hot air to rise. This allows the hot air to be introduced in the bottom of the walls of the house being heated and then rise to the cold air returns which are located in the upper part of the walls.

It has been found that for best results the circulating fan of the down flow furnace therefore should not be controlled in the same manner as the fan control system above described.

If a fan switch apparatus such as is used in a conventional furnace is used on a down flow furnace, the placing of the temperature sensitive element at the bottom or discharge end of the furnace allows the fan switch apparatus to give good control in turning the circulating fan off. However, the fan switch apparatus gives poor control in turning the circulating fan on. This is true because the hot air within the down flow furnace accumulates at the top of the furnace and leaves the furnace out of what normally is the intake end. This draws cool air into the discharge end to cool the temperature sensitive element at a time when the temperature sensitive element should be sensing a rise in temperature within the down flow furnace.

Placing the temperature sensing element at the top, or intake end of the furnace, allows the fan switch apparatus to give good control in turning the circulating fan on. However, once the circulating fan is turned on the top of the furnace receives the cool air of the area to be heated and the temperature sensing element may be cooled to a point to cause the circulating fan to be turned off prematurely.

As would seem apparent, by a great deal of experimentation a proper location may be found for the temperature responsive means where the operation of the circulating fan may be adequate. However, this location will vary with each furnace and is somewhat critical.

It is therefore an object of the present invention to provide a control apparatus for controlling the circulating fan of a down flow furnace which apparatus is readily adaptable to all types of down flow furnaces and is not critical in its installation or operation.

It is a further object of the present invention to provide a control apparatus for a circulating fan of a forced air furnace which energizes the circulating fan a predetermined time after energization of the burner independent of the temperature of the bonnet of the furnace and which returns the energization of the circulating fan to the control of the bonnet temperature upon the end of a call for heat.

It is a further object of the present invention to provide a control apparatus for use with a down flow type of forced air furnace having a timer which is energized at the same time as the fuel valve of the burner and operates to turn on the circulating fan a predetermined time after energization of the fuel valve, and having a temperature responsive means responding to the temperature of the furnace bonnet to control the temperature at which the circulating fan will be deenergized after the end of a call for heat.

The single figure is a diagrammatic and schematic showing of the present invention.

Referring to the figure, the numeral 10 indicates a burner unit having a fuel valve 11, a main burner 12, and a pilot burner 13. The pilot burner is connected to the fuel supply line on the upstream side of the valve 11 and is known as a standing pilot since a pilot flame continuously is present at the pilot burner 13. It will be understood that a pilot safety mechanism can be provided if desired to check the presence of the pilot flame at the pilot burner 13. However, this is not shown.

The burner unit 10 is located within a down flow furnace, not shown, having a circulating fan motor 14. The broken line designated by the numeral 15 represents the heat exchange chamber of the furnace which is also known as a bonnet or plenum chamber.

The improved control apparatus includes a bimetal actuator 16 which is located within the bonnet of the down flow furnace and is responsive to the temperature of this bonnet to cause rotation of a shaft 17 which extends out of the bonnet and controls the position of a cam 18. The cam 18 rotates in the direction as indicated by the arrow as the bonnet 15 is heated by the burner unit 10. A roller 19 engages cam 18. Roller 19 is mounted for rotation on the end of a rigid arm 20, which arm is pivoted at 21 to a rigidly secured member 22.

A second rigidly secured member 23 mounts a switch 24 of a type disclosed in the McGall Patent 1,960,020. Switch 24 is rigidly secured to the member 23 by means of bolts 25 and 26 and is provided with switch terminals 27 and 28. An actuator 29 for switch 24 engages the rigid arm 20 and is actuated by movement of this member. The spring 30 is provided to bias rigid arm 20 for clockwise rotation about pivot 21.

A timer in the form of a heat motor 40 is provided and consists of a bimetal element 41, insulating spacers 42 and 43, supporting clamp 44, and a wire wound resistance heater 45. Bimetal element 41 is fastened to a rigid supporting member 50. The bimetal element 41 is operative upon the energization of the heater 45 to move in the direction of the arrow shown in the figure.

A rigid member 60 is provided and mechanically couples the bimetal element 41 to the rigid arm 20. Member 60 passes through a hole in arm 20 and is rigidly fixed to the arm, that is, any movement of arm 20 causes member 60 to move. Member 60 also passes in sliding engagement through a hole in bimetal 41. The left hand end of member 60 is bent and forms a hook to engage bimetal 41. Therefore, movement of bimetal 41 to the left causes member 60 to also move to the left as the bimetal heats causing the spring tension of spring 30 to be overcome and the rigid arm 20 moves counterclockwise about pivot 21 thereby causing roller 19 to disengage cam 18. However, due to the sliding engagement of bimetal 41 and member 60, return movements of bimetal 41 to the right as the bimetal cools does not cause member 60 to also move to the right. Member 60 and arm 20 move to the right under the force exerted by spring 30.

A primary controller or thermostat which is responsive to the need for operation of the burner unit 10 is indicated at 61 and is located in the space to be heated by the down flow furnace.

Operation

The apparatus as shown in the figure is in the standby condition, that is with a flame present at the pilot burner 13, and with the timer 40, fuel valve 11, and circulating fan 14 deenergized. The temperature of the bonnet 15 is of a low value and arm 20 is in a position to cause the microswitch 24 to move to an open circuit condition.

If it is now assumed that there is a call for heat, as indicated by thermostat 61 closing its contacts, a circuit can be traced from power line conductor 70 through conductor 71, thermostat 61, conductor 72, heater 45 of timer 40, conductor 73, and fuel valve 11 back to power line conductor 74. This circuit energizes both heater 45 and valve 11.

With the fuel valve 11 energized gas will pass to the burner 12 and be ignited by the standing pilot 13. The operation of the burner 12 causes the temperature of the bonnet chamber 15 to rise. However, due to the fact that a predetermined amount of rotation of cam 18 is necessary before arm 20 is moved, switch 24 remains in circuit opening position.

After a predetermined period of time of energization of the heater 45 of timer 40, bimetal 41 is heated and moves to the left. Movement of bimetal 41 is transmitted through member 60 to arm 20 to cause arm 20 to move to the left. This allows the plunger 29 of switch 24 to move out and the switch moves to its circuit closing condition. A circuit can now be traced from power line conductor 70 through conductor 80, terminals 28 and 27 of switch 24, conductor 81, circulating fan motor 14, and conductor 82 back to power line conductor 74.

Therefore, at this time the circulating fan of the down flow furnace is energized and the air in the bonnet of the down flow furnace is circulated to the space to be heated. While the timing period of the timer 40 can be made as long as desired it has been found that for a particular application the turning on of the circulating fan 60 seconds after the fuel valve 11 has been energized is desirable.

From the above it can be seen that a control apparatus has been provided wherein the circulating fan of a forced air type furnace is energized a predetermined time after the fuel valve is energized and that this energization is independent of the temperature of the bonnet.

Further operation of the burner unit 10 causes the temperature of the bonnet 15 to raise to a point where a raised portion 90 of the cam 18 has been rotated clockwise to a point where the roller 19 may be engaged by this portion of cam 18.

This is the running condition of the control apparatus and this condition will exist so long as there is a need for operation of the fuel burner unit 10 as exemplified by the continued closing of the contacts of the thermostat 61. Upon the thermostat 61 being satisfied the above traced circuit for the heater 45 of timer 40 and the fuel valve 11 is deenergized. Therefore, the flame at the main burner 12 is turned off and heat no longer is supplied to the bonnet 15. The bimetal 41 of timer 40 rapidly cools and moves back to the position as shown in the figure. This causes arm 20 to move to the right. However, the extent of movement to the right of arm 20 is restricted by the raised portion 90 of cam 18 since the bonnet 15 is still hot. This prevents the arm 20 from moving to a position to move the plunger 29 of switch 24 sufficiently into the switch to cause the switch to move to its circuit opening position. Therefore, the above traced energizing circuit for the circulating fan motor 14 remains energized.

As the circulating fan 14 continues to force air through the bonnet 15, the bonnet will gradually cool and the cam 18 will rotate in a counterclockwise direction. As soon as the roller 19 moves off of the raised portion 90 of the cam the arm 20 is allowed to move sufficiently far to the right to actuate the plunger 29 of switch 24 and cause the switch to move to its circuit opening condition. This deenergizes the circulating fan motor 14.

It can therefore be seen that I have provided an improved control apparatus wherein the circulating fan motor of a forced air type heating system is initially energized a predetermined time after opening of the main valve and is deenergized upon the air being circulated through the furnace cooling to a predetermined temperature. Other modifications of the present invention will be apparent to those skilled in the art and it is intended that the present invention be limited only by the scope of the appended claims, of which I claim:

1. Control apparatus for use with a forced air furnace having a primary controller which energizes a fuel valve in response to a need for operation of the furnace, comprising; a bimetal actuator adapted to be located within the furnace heat exchanger, cam means connected to said bimetal actuator and controlled by said actuator, normally open switching means adapted to be connected to the circulating fan of a furnace to energize the fan when said switching means is closed, means operatively associating said cam means and said switching means whereby said switching means is closed by said cam means upon a temperature rise in the heat exchanger, and further means controlled by the furnace primary controller and operatively associated with said switching means to initially close said switching means independent of said cam means upon the primary controller energizing the fuel valve.

2. A fuel burning system comprising, a furnace having a bonnet, a circulating fan, and a fuel valve; a source of power, switch means connecting said circulating fan to said source of power, said switch means normally being in circuit opening condition, temperature responsive means responsive to the temperature of said bonnet and arranged to control said switch means to move said switch means to circuit closing condition when the temperature of said bonnet is within a given range, a thermostat responsive to the need for operation of said furnace, motor means, circuit means including said thermostat, said motor means, and said fuel valve whereby said motor means and said valve are energized upon a need for operation of the fuel burner, and means connecting said motor means to said switch means whereby said switch means is initially moved to circuit closing condition to energize said circulating fan independent of the temperature of said bonnet, said motor means returning said switch means to the control of said temperature responsive means upon said thermostat indicating that there is no longer a need for operation of said furnace.

3. A fan control for use with a forced air furnace comprising, switch means having an open circuit and a closed circuit condition and adapted to be connected to the circulating fan of a forced air furnace, a first actuator responsive to the temperature of the furnace to control said switch means to energize the circulating fan in accordance with the temperature of the furnace, and a second actuator energized so long as there is a call for heat in the space in which the temperature is being controlled and operative to control said switch means to initially energize the circulating fan independent of the temperature of the furnace, said second actuator returning said switch means to the control of said first actuator at the end of a call for heat to thereby allow the circulating fan to operate so long as said first actuator responds to a given temperature of the furnace.

4. A circulating fan switch for use with a down flow furnace comprising, switching means adapted to energize the circulating fan when actuated to circuit closing condition, a first bimetal actuator adapted to be located in the heat exchange chamber of a furnace, a first member mechanically coupling said switching means and said first bimetal actuator whereby movement of said first bimetal actuator in response to the temperature of the heat exchange chamber of a furnace causes said switching means to be actuated to circuit closing condition, a second bimetal actuator, means responsive to the temperature of a space for energizing said second actuator as long as there is a need for operation of the furnace, and a second member mechanically coupling said second bimetal actuator to said first member to move said first member to actuate said switching means to circuit closing condition a predetermined time after energization of said second actuator to thereby initially energize the circulating fan independent of the heat exchange chamber temperature.

5. A control system comprising; a down flow furnace having a circulating fan, a bonnet, and a fuel valve; a bimetal actuator mounted in said bonnet and responsive to the temperature of said bonnet, switch means normally in circuit opening condition and connected to said circulating fan to cause energization of said circulating fan in accordance with the temperature of said bonnet, a heat motor having a bimetal element and a heater, a primary controller responsive to a condition indicative of a need of operation of said furnace adapted to move to circuit closing condition upon a call for operation of said furnace, circuit means including said controller, said fuel valve and said heater to energize said valve and heater upon a call for operation of said furnace, and means controlled by the bimetal element of said heat motor to actuate said switch means to thereby initially energize said circulating fan independent of the temperature of said bonnet, said heat motor cooling upon the end of a call for operation of said furnace to return said switch means to the control of said bimetal actuator so that operation of said circulating fan may continue until said bonnet cools.

6. Control apparatus for use with a furnace having a circulating fan and a bonnet, comprising; normally open switch means adapted to be connected to the circulating fan to cause energization of the fan upon said switch means being closed, temperature responsive means adapted to sense the temperature of the bonnet, a first member controlled by said temperature responsive means cooperating with said switch means and adapted to close said switch and maintain said switch means closed as long as the temperature of the bonnet is above a given minimum value, means responsive to space temperature, a timer energized upon a call for heat by said aforementioned means, and a second member controlled by said timer and cooperating with said switch means, said second member being operative to initially close said switch means a given time after a call for heat independent of said first member and being operative to return said switch means to the control of said first member a given time after the end of a call for heat to thereby cause the circulating fan to be energized a timed period after a call for heat and cause the fan to operate after a call for heat for a period determined only by the temperature of the bonnet.

References Cited in the file of this patent

UNITED STATES PATENTS

| | | |
|---|---|---|
| 1,846,292 | Whiteley | Feb. 23, 1932 |
| 2,216,281 | Ray | Oct. 1, 1940 |
| 2,221,164 | Denison | Nov. 12, 1940 |
| 2,289,206 | Nessell | July 7, 1942 |
| 2,372,307 | Alexander | Mar. 27, 1945 |
| 2,596,290 | Ryder | May 13, 1952 |
| 2,642,227 | Ray | June 16, 1953 |